United States Patent
Tesar et al.

(10) Patent No.: US 7,033,544 B2
(45) Date of Patent: Apr. 25, 2006

(54) DETERMINATION OF SUPPLEMENTAL FUEL REQUIREMENT AND INSTANTANEOUS CONTROL THEREOF INVOLVING REGENERATIVE THERMAL OXIDATION

(75) Inventors: Michael G. Tesar, Green Bay, WI (US); Andreas C. H. Ruhl, DePere, WI (US); Steven J. Zagar, Luxemburg, WI (US)

(73) Assignee: Megtec Systems, Inc., DePere, WI (US)

( * ) Notice: Subject to any disclaimer, the term of this patent is extended or adjusted under 35 U.S.C. 154(b) by 225 days.

(21) Appl. No.: 10/416,929

(22) PCT Filed: Dec. 7, 2001

(86) PCT No.: PCT/US01/48275

§ 371 (c)(1),
(2), (4) Date: Dec. 3, 2003

(87) PCT Pub. No.: WO02/48814

PCT Pub. Date: Jun. 20, 2002

(65) Prior Publication Data

US 2005/0260103 A1    Nov. 24, 2005

Related U.S. Application Data

(60) Provisional application No. 60/255,252, filed on Dec. 13, 2000.

(51) Int. Cl.
*G05D 23/00* (2006.01)

(52) U.S. Cl. .................. 422/111; 422/173; 422/175; 422/177; 432/181

(58) Field of Classification Search ............. 422/173, 422/175, 177, 109, 111; 432/181
See application file for complete search history.

(56) References Cited

U.S. PATENT DOCUMENTS

| 3,870,474 A |   | 3/1975 | Houston ............... 23/277 C |
| 5,417,927 A |   | 5/1995 | Houston ............... 422/110 |
| 5,620,668 A | * | 4/1997 | Driscoll et al. ........ 422/175 |

(Continued)

FOREIGN PATENT DOCUMENTS

EP    0 702 195    * 3/1996

(Continued)

*Primary Examiner*—N. Bhat
(74) *Attorney, Agent, or Firm*—Mitchell D. Bittman; Kevin S. Lemack

(57) ABSTRACT

A control system for a regenerative thermal oxidizer in which contaminated air is first passed through a hot heat-exchange bed and into a communicating high temperature oxidation (combustion) chamber, and then through a relatively cool second heat exchange bed. The apparatus includes a number of internally insulated, ceramic filled heat recovery columns topped by an internally insulated combustion chamber. Contaminated air is directed into heat exchange media in one of said columns, and oxidation is completed as the flow passes through the combustion chamber. From the combustion chamber, the now clean air flows through another column containing heat exchange media, thereby storing heat in the media for use in a subsequent inlet cycle when the flow control valves reverse. The resulting clean air is directed via an outlet valve through an outlet manifold and released to atmosphere or is recirculated back to the oxidizer inlet. A combustible fuel such as natural gas is added to the inlet-contaminated air prior to its entry into the hot heat exchange column when the contaminant concentration in the contaminated air falls below a predetermined level. The oxidizer is preferably integrated with a web dryer, such that hot aire from the combustion chamber is supplied to the dryer.

4 Claims, 9 Drawing Sheets

U.S. PATENT DOCUMENTS

| | | | |
|---|---|---|---|
| 5,707,229 A | * | 1/1998 | Klobucar ................... 432/181 |
| 5,755,569 A | * | 5/1998 | Berg et al. ................. 432/181 |
| 5,833,938 A | * | 11/1998 | Blazejewski ............... 422/175 |
| 5,837,205 A | * | 11/1998 | Bayer et al. ............... 422/109 |
| 6,000,929 A | | 12/1999 | Izumo et al. ................ 431/7 |
| 6,086,828 A | * | 7/2000 | Thompson ................. 422/173 |
| 6,321,462 B1 | * | 11/2001 | Seidl et al. .................. 34/423 |
| 6,749,815 B1 | * | 6/2004 | Cash ......................... 422/175 |

FOREIGN PATENT DOCUMENTS

WO     WO 97/43527    * 11/1997

* cited by examiner

Media Bed Heat Index Equation $(F(x)_4)$:
$1.016E + 0.889D + 0.762C + 0.635B + 0.508A$ Weighted Multiplier Development Equation:
$2(X^{}2) + 1.75(X^{}2) + 1.5(X^{}2) + 1.25(X^{}2) + 1(X^{**}2) = 8000$

DETERMINATION OF SUPPLEMENTAL FUEL REQUIREMENT AND INSTANTANEOUS CONTROL THEREOF INVOLVING REGENERATIVE THERMAL OXIDATION

This application claims the benefit of U.S. provisional application No. 60/255,252, filed Dec. 13, 2000.

BACKGROUND OF THE INVENTION

The control and/or elimination of undesirable impurities and by-products from various manufacturing operations have gained considerable importance in view of the potential pollution such impurities and by-products may generate. One conventional approach for eliminating or at least reducing these pollutants is by oxidizing them via incineration. Incineration occurs when contaminated air containing sufficient oxygen is heated to a temperature high enough and for a sufficient length of time to convert the undesired compounds into harmless gases such as carbon dioxide and water vapor.

In view of the high cost of the fuel necessary to generate the required heat for incineration, it is advantageous to recover as much of the heat as possible. To that end, U.S. Pat. No. 3,870,474 (the disclosure of which is herein incorporated by reference) discloses a thermal regenerative oxidizer comprising three regenerators, two of which are in operation at any given time while the third receives a small purge of purified air to force out any untreated or contaminated air therefrom and discharges it into a combustion chamber where the contaminants are oxidized. Upon completion of a first cycle, the flow of contaminated air is reversed through the regenerator from which the purified air was previously discharged, in order to preheat the contaminated air during passage through the regenerator prior to its introduction into the combustion chamber. In this way, heat recovery is achieved.

U.S. Pat. No. 4,302,426 discloses a thermal regeneration anti-pollution system which adjusts for excessive temperatures in the high temperature incineration or combustion zone. To that end, the temperature in the combustion zone is sensed, and when a predetermined high temperature is reached therein, the gases that normally would be passed through the heat exchange bed are instead bypassed around the bed, then combined with other gases that have already been cooled as a result of their normal passage through a heat exchange bed, and are exhausted to atmosphere.

Regenerative thermal oxidation is used when the concentration of the volatile organic compounds (VOC'S), such as combustible solvents or fuels, in polluted process gases lie outside the limits of the explosive levels of the VOC's in the gas being processed. If, at the same time, the concentration of the VOC's, also referred to as the energy density parameter, is below the self-sustaining margin to maintain their thermal oxidation, a burner or other heating device may provide the supplemental energy. To heat the polluted process gas, the sensible energy content of the oxidized (i.e., cleaned) process gas can mostly be consumed. Therefore, two main advantages are obtained by eliminating the burner operation or other heating device: the energy efficiency of the system increases since no combustion air necessary to operate the burner needs to be added and heated; and the potential for generation of noxious gases ($NO_x$), such as those that may be formed inside a burner flame, is decreased or eliminated.

Usually, by measurement of the temperature between regenerative thermal oxidizer heat exchange beds and/or inside the heat exchanger beds, and further by comparison of the sensed temperature(s) with fixed set point(s), the required supplemental fuel is detected. Then, according to the temperature difference(s), the control adjusts for the injection rate of the necessary fuel into the system to increase the energy density of the air stream to the oxidizer.

This approach is feasible as long as the exothermic energy of the supplemental fuel is solely employed to sustain the thermal oxidation. However, the methods needs to be refined if more fuel is introduced than needed to maintain the thermal oxidation without the use of a supplemental heat source such as a burner. This may occur, for example, where excess fuel is injected for branching off high caloric enthalpy streams in order to use their energy in other processes, such as a second heat exchanger of as a heat source for a dryer.

The reason for modification is that heat exchanger media beds typically contain ceramic or other media characterized by a high specific heat capacity. Therefore, the heat exchanger beds are able to store an ample amount of energy and may transfer temporarily more heat to the process gas than received back. This imbalance can take place without detection, since no temperature alteration initially occurs. Nevertheless, the delayed temperature change triggers an adjustment of the fuel injection. The temperature may then rise or not rise, depending on the severity of the energy imbalance. In the worst case, a phenomenon of collapsing temperature profile occurs, wherein the control for the fuel injection cannot compensate for the heat imbalance since the duration of the oxidation of the fuel (i.e., residence time) increases with decreasing temperatures and the chemically bound energy of the fuel may remain partly unreleased.

In order to prevent collapsing temperature profiles in the heat exchanger, an improved and fast-acting fuel control is desired.

SUMMARY OF THE INVENTION

The problems of the prior art have been solved by the present invention, which provides a regenerative thermal oxidizer and control system in which suitable temperatures of the process gas are measured within the heat exchanger beds of the regenerative oxidizer. Depending upon the complexity of the system, two or more temperature points may be required for optimum control. The sensed temperatures are then compared to a calculated value, and appropriate adjustment is made to the set point of the required energy density parameter of the air stream to the oxidizer. The present invention is also directed to a process of controlling the injection of supplemental fuel or airflow to obtain the set point energy density as outlined above.

The control scheme incorporates variable switch times based on exhaust flow that are modified by the individual media bed heat index values to maintain equal thermal energy in each of the beds. The dryer exhaust energy density control scheme utilizes a unique energy density feedforward control technique that actively tracks and reacts to energy usage of integrated thermal oxidizer/dryer system. The dryer exhaust energy density control scheme uniquely uses an energy density instrument to measure the energy density of the dryer exhaust flow which is of particular advantage in the heat set web offset printing process. This technique does not base the exhaust rate on press speed as in the past, but allows it to be optimized by regulating exhaust rate to maintain an energy density set point. As the exhaust flow has a direct impact on many of the integrated regenerative thermal oxidizer/dryer control loops, many innovative techniques such as relational gain split ranging, high signal select circuits, and a press speed feedforward have been applied to the exhaust flow set point generation logic. The net result is a responsive, efficient, and adaptive control scheme.

In one embodiment of the invention, the industrial effluent to be treated, such as contaminated air, is first passed through a hot heat-exchange bed and into a communicating high temperature oxidation (combustion) chamber or zone, and then through a relatively cool second heat exchange bed. The apparatus preferably includes a number of internally insulated, heat exchange columns filled with heat exchange media such as ceramic refractory material, the heat exchange columns being in fluid communication with an internally insulated combustion chamber where oxidation of any remaining unoxidized VOC's is completed. Contaminated air is fed into the apparatus through an inlet manifold containing suitable valving. The air is then directed into the heat exchange media that contains "stored" heat from the previous recovery cycle. As a result, the contaminated air is heated to near oxidation temperatures. Oxidation is completed as the contaminated air passes through the combustion chamber, where one or more burners or other heating means are located. The contaminated air is maintained at the operating temperature for an amount of time sufficient for completing destruction of the contamination. From the combustion chamber, the clean air flows through another column containing heat exchange media, thereby storing heat in the media for use in a subsequent inlet cycle when the flow control valves reverse. The resulting clean air is directed via an outlet valve through an outlet manifold and released to atmosphere at a slightly higher temperature than the inlet, or is recirculated back to the oxidizer inlet, or is directed to additional apparatus where its heat can be utilized.

DETAILED DESCRIPTION OF THE INVENTION

Figure 1:
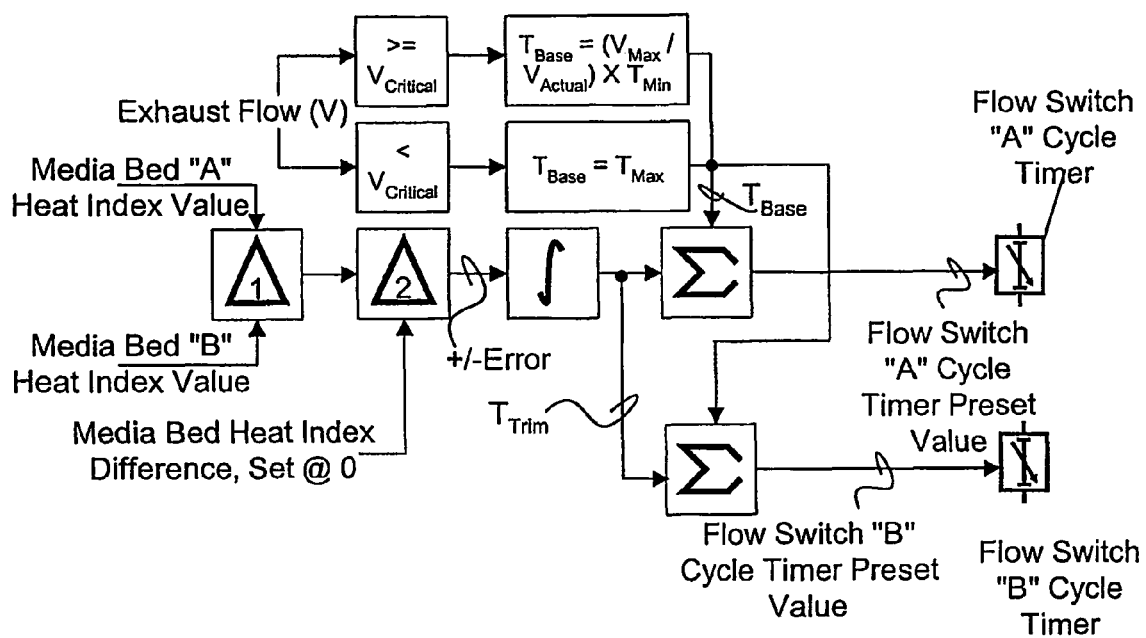
FIG. 1 is a flow diagram of the heat index values in accordance with the present invention.

Preferably the thermal oxidizer regenerative system of the present invention consists of two or three regenerative columns, most preferably two columns, each in fluid communication with a combustion chamber or zone. In one particularly preferred embodiment discussed in greater detail below, the regenerative thermal oxidizer consists of two heat exchanger columns, opposing one another, with the combustion chamber or zone centrally located between each column. Each of the two columns contains heat exchange media, preferably monolithic blocks of structured ceramic heat exchange media characterized by axial gas flow passages directing the flow of process gas to and from the combustion chamber in a horizontal or substantially horizontal fashion. The combustion zone of the oxidizer is in communication with a web dryer, preferably a web flotation dryer, such that a portion of hot process gas from the combustion zone is directed to the air flotation nozzles that heat and float the web traveling through the dryer. Such apparatus is disclosed in PCT published application No. PCT/US99/09943, the disclosure of which is hereby incorporated by reference.

Utilizing the first law of thermodynamics, the appropriate locations of the points where the temperature is sensed or measured are located. In addition, the energy balance of the system can be expressed by one equation in such a way that an "energy density" is stated on one side of the equation, and the sensed temperatures on the other. The "energy density" as used herein is defined as the fuel consumption of the entire system divided by the polluted process gas flow streaming into the oxidizer. This energy density is a calculated value of the process, derived from instantaneous process temperature measurements. For control purposes, the energy density is combined with a second term that adds or subtracts fuel (e.g., via a proportional, proportional and integral, or proportional, integral and derivative (PID) loop). This predicted energy density is compared with the results of an analyzer that senses the real energy density in the process flow at a suitable position after the location of the fuel injection but before the inlet into the oxidizer. Such analyzers are commercially available from Control Instruments Corporation, for example. According to the difference between the predicted energy density and the sensed energy density, the control adjusts for the injection rate of the required supplemental fuel or air exhaust rate to the oxidizer.

Valve Switch Timing Control Scheme

The process of heating up the integrated regenerative oxidizer involves ignition of the burner system, a controlled temperature ramp, and flow of process air is continuously reversed by flow diversion devices through the oxidizer sections. For example, with reference to FIG. 2, process exhaust enters media bed A, flows across the combustion chamber, and exits through media bed B for a determined period of time. Upon completion of said period of time, a flow diversion device switch or valve redirects the flow so that it enters media bed B, flows across the combustion chamber, and exits through media bed A for a second determined period of time, distinct from said first period of time. The sequence is continuously repeated during operation of the oxidizer. The valve switch time period is determined from a summation of two sets of logic equations. The first set of logic defines the common base switch time ($T_{Base}$) for both beds based on the exhaust flow ($V_{Actual}$). As the exhaust flow increases and if switch time is kept constant, solvent laden exhaust retention time in the media beds is decreased and the oxidation location in the media beds shifts toward the combustion chamber. With a constant switch time, there exists a threshold exhaust flow ($V_{critical}$) that moves the oxidation point to the edge of the combustion chamber.

The base switch time is calculated relative to the exhaust flow volume in the following logic (refer to FIG. 1):

If $V_{Actual} <= V_{critical}$, $T_{Base} = T_{max}$;

If $V_{Actual} > V_{critical}$, $T_{Base} = V_{max}/V_{Actual} \times T_{min}$.

Where:
$V_{max}$=maximum exhaust flow
$V_{Actual}$=actual exhaust flow
$V_{critical}$=critical exhaust flow
$T_{Base}$=base switch time
$T_{max}$>=maximum base switch time
$T_{min}$=minimum base switch time.

The second set of logic involves calculating the corrective time ($T_{Trim}$) required to balance the latent heat in each of the media beds. The media bed latent heat is quantified by calculating a Media Bed Heat Index Value for each of the media beds. Development of the Media Bed Heat Index Values is covered in detail below. Referring to FIG. 1, $T_{Trim}$ is calculated by deriving an actual Media Bed Heat Index Difference (1) between each of the individual media bed's Heat Index Values. The actual Media Bed Heat Index Difference is then compared (2) to the desired Media Bed Heat Index Difference value, which is set at zero (0). This function results in a polar (+/−) error value that is integrated over time to produce a corrective time value ($T_{Trim}$) that is used to alter the base time ($T_{Base}$) in correlation to the magnitude of difference between the Media Bed Heat Index Values.

Media Bed Heat Index Value

The media beds absorb the thermal energy given off by the burner or by oxidation of either injected supplemental fuel gas or by hydrocarbons VOC's in the process exhaust stream. Theoretically, if the alternating flow paths of the regenerative thermal oxidizers, fuel concentration, thermal mass and chamber volumes, etc. were equal, the regenerative thermal oxidizer media beds stored thermal energy would be equal and switch or cycle times would be fixed at the $T_{Base}$ time period. In practice, this scenario is not realistic. Flow paths are not always symmetrical, media beds are not packed identically, or other construction and process anomalies can contribute to unequal heating of the media beds. Conventionally, the switch times were changed equally relative to the implying of exhaust flow through use of the exhaust fan drive output frequency. Temperature measuring devices such as thermocouples are used to point monitor the temperature at selected locations along the media bed.

When the media beds are under the presence of unequal flow volumes or excessive concentrations of process hydrocarbons, the oxidation point in the bed will move away from the combustion zone toward the media beds inlet area. This condition is sensed by a temperature-measuring device, typically a thermocouple, located close to the inlet area of the media bed and the cycle time for this bed is decremented by a predetermined value of seconds each time the control logic rung is scanned. As the oxidation point in the bed moves back toward the combustion chamber, the inlet temperature measuring point's temperature decreases and the media bed's cycle time is then increased by a predetermined value of seconds each time the control logic is scanned until the affected media bed's cycle time is equal to the base cycle time for the other media beds. In applying regenerative thermal oxidation technology to processes that use some of the combustion chambers thermal energy for a process, such as a regenerative thermal oxidizer directly coupled to a printing press dryer, it is imperative that the combustion chamber be held at a constant temperature for accurate process drying conditions. The present invention actively tracks and maintains equal stored thermal energy in the media beds by using an array of temperature sensing element readings located along the length of each media bed in a Heat Index Equation. For example (referring to FIG. 2), in a media bed with 5 thermocouples, the heat index equation can be:

Media Bed Heat Index Value=$1.016E+0.889D+0.762C+0.635B+0.508A$

Where:
A is the temperature of the media bed at point A located 1' from the combustion chamber media face.
B is the temperature of the media bed at point B located 2' from the combustion chamber media face.
C is the temperature of the media bed at point C located 3' from the combustion chamber media face.
D is the temperature of the media bed at point D located 4' from the combustion chamber media face.
E is the temperature of the media bed at point E located 5' from the combustion chamber media face.

Figure 2:
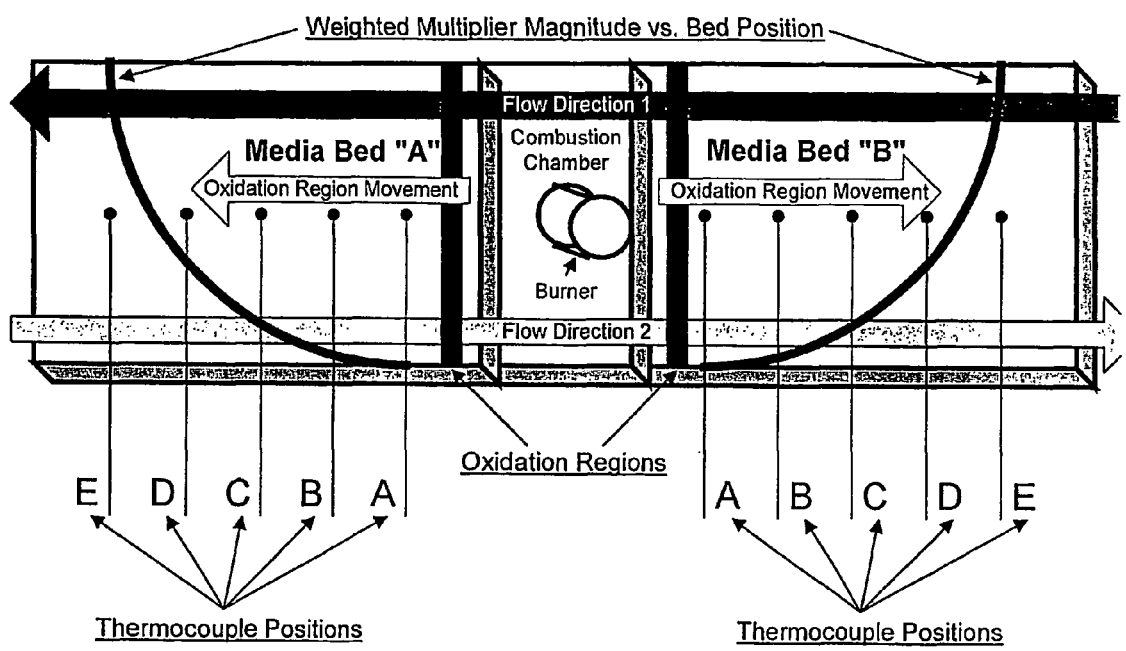
FIG. 2 is a schematic diagram of the location of temperature sensors in the oxidizer in accordance with one embodiment of the present invention.

The multipliers for the variables are calculated in the Weighted Multiplier Development Equation in FIG. 2 by solving for X. To solve for X, the span value of the controller equation must be known. In FIG. 2, the value 8000 is represented as 16000/2. 16000 is the full signal digital count resolution of the controller. If the value of each media bed was left at 16000, the result of taking the difference between the media beds could produce a bipolar number >16000, which exceeds the resolution of the controller. It is therefore necessary to divide the total resolution count value by 2 to limit the potential value of the differential between the media beds to the maximum resolution value of the controller, which is 16000 in this case. Solving for X and substituting, yields the multiplier values in the Media Bed Heat Index Value equation. The unique feature to the media bed heat index value technique lies in the application of position weighted multiplication (Y) of the respective temperature measurements (measurement) taken to a selected power (x), $Y*(\text{measurement})^x$. The summation of the resultants yields a value that remains relationally small if the oxidation region remains close to the combustion chamber. If due to process anomalies, one of the media beds oxidation regions moves farther away from the combustion chamber in relation to the other media beds, it's media heat index value increases exponentially, creating a large Media Heat Index Value Difference, thereby causing a large $T_{Trim}$ correction in the $T_{Base}$ switch time. The result will cause the media bed with the extended oxidation region to be relocated back toward the combustion chamber. This technique keeps $T_{Trim}$ to a minimum, providing little corrective action to the $T_{Base}$ switch time while the media bed profiles are similar but quickly attempts prompt corrective action when a media bed's profile adversely deviates from the rest. Stable combustion chamber temperature is mandated for accurate operation of the dryer's temperature control loops. The heat index value serves thus the following purposes:

a. Provides a value indicative of the media bed stored thermal energy.

b. Provides a value indicative of the location of the oxidation point in the media bed.

c. Provides stable combustion chamber temperature for accurate dryer temperature control loops.

Heat Up of the Oxidizer Media Beds

The oxidizer/dryer system is started, media bed flow diverting valves enabled, system is purged, and burner is ignited. During the heat-up period, the heat content of each of the media beds is monitored and controlled by using the control scheme as described above. When the temperature of the combustion chamber reaches a predetermined limit, such as 1525° F., the supplemental gaseous fuel source is admitted into the dryer exhaust stream and is controlled to a specific concentration level, for example, BTU/CU FT, or % LFL. Suitable supplemental gaseous fuel sources include natural gas and propane. As the additional fuel ignites, the temperature of the combustion chamber increases, closing the burner throttle to pilot position. When the burner throttle reaches pilot position and the combustion chamber temperature is above a predetermined value over a setpoint, such as 1650° F. with a setpoint of 1600° F., the burner is disabled. At this point, combustion is occurring in the media beds and the combustion chamber temperature is controlled by modulating the energy density set point. To prevent the in-bed combustion from ceasing, enough fuel gas must be admitted to generate the necessary heat for combustion to continue to occur. On the other extreme, if excess fuel gas is applied to the bed, the location of the oxidation zone will move away from the combustion zone toward the cold faces of the heat exchange beds. If this situation is allowed to continue, the cold face temperatures will increase and adversely affect the mechanical integrity and flow capacity of the oxidizer system. Therefore, it is imperative that the concentration of fuel gas be maintained at a self-sustaining point of operation.

Energy Density Feedforward Signal Development

Regenerative thermal oxidation is used when the concentration of the combustible solvents in polluted process gases lie outside the limits of the explosive levels. If, at the same time, the concentration of the solvents is below the self-sustaining margin to maintain their thermal oxidation, a burner may provide the supplemental energy. To heat-up the polluted (i.e., dirty) process gas, the energy content of the oxidized (i.e., cleaned) process gas can mostly be consumed. Instead of operating a burner, gaseous and/or liquid fuel can be injected into the process gas. This can be more efficient. Therefore, two main advantages are obtained by eliminating the burner operation:

(1) The energy efficiency of the system increases since no combustion air needs to be added and heated.

(2) The potential for generation of noxious gases ($NO_x$), such they may be formed inside burner flames, is decreased or eliminated.

Usually, by measurements of the temperature inside the heat exchanger beds and further by comparison of the sensed temperature(s) with fixed set point(s), the required supplemental fuel is detected. Then, according to the temperature difference(s), the control adjusts for the injection rate of the necessary fuel into the system.

This approach is feasible as long the exothermic energy of the supplemental fuel is solely employed to sustain the thermal oxidation. However, the method needs to be refined if more fuel is needed to maintain the thermal oxidation and provide high temperature air from the combustion chamber for process heating purposes, such as used for heat set web offset printing.

The reason for refinement is heat exchanger beds typically contain ceramic media characterized by a high specific heat capacity. Therefore, the heat exchanger beds are able to store an ample amount of energy and may transfer temporarily more heat to the process gas than receiving back. This imbalance can take place without detection since no sensible temperature alteration initially occurs. Once detected, the delayed temperature change triggers an adjustment for the fuel injection, in which, the temperature may rise or not depending on the severity of the energy imbalance. In worst situations, the temperature profile collapses and additional fuel injection cannot make up for the heat imbalance as fuel oxidation reaction time increases with decreasing temperatures, leaving the fuel's chemically bounded energy remain partly unreleased. In order to prevent collapsing temperature profiles in the heat exchanger beds, an improved and fast acting fuel control scheme is desirable.

Quick supplemental energy determination can be ascertained by measuring suitable process gas temperatures external to the heat exchanger beds. The complexity of the given system will dictate the temperature points required (e.g. six positions for an integrated regenerative thermal oxidizer/dryer).

Figure 9:
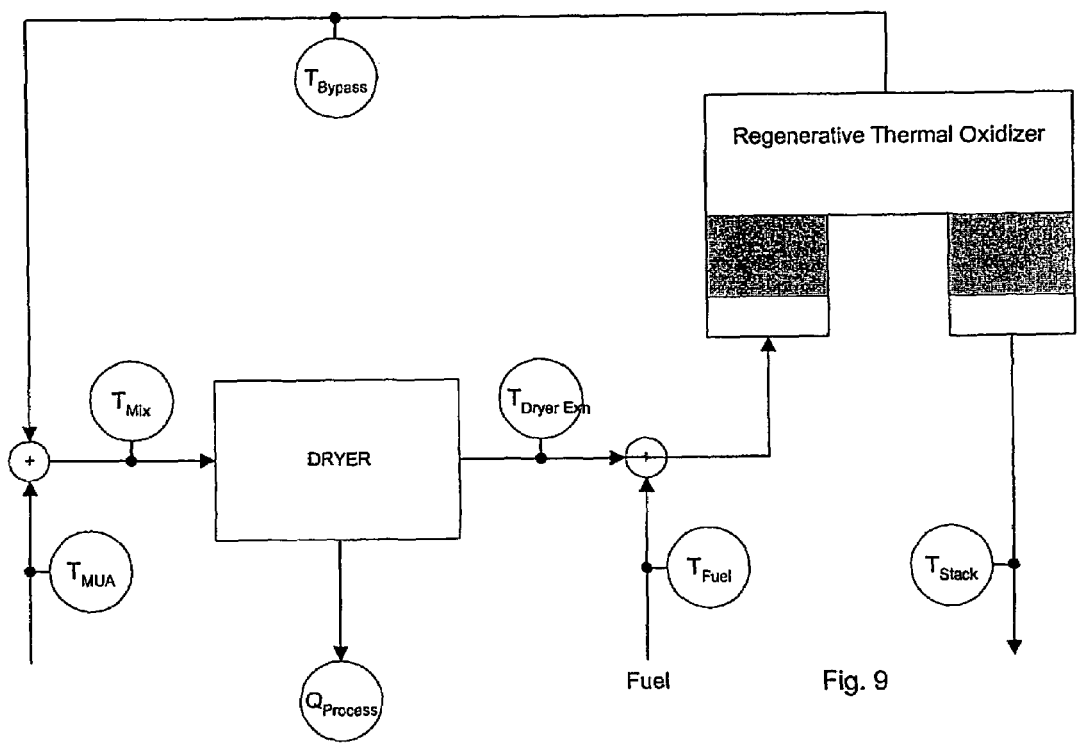
FIG. 9 is a schematic representation showing the location of temperature sensors in accordance with one embodiment of the present invention.

Utilizing the first law of thermodynamics assists in locating the appropriate temperature points. Moreover, the energy balance can be summed up to one equation in such a way that an 'energy density' is stated on one side of the equation and the sensed temperatures are on the other side. (The 'energy density' is defined as the fuel consumption of the entire system divided by the dryer exhaust flow into the heat exchanger beds (See FIG. 9 for temperature locations)

$$(F(x))_{10} = V_{fuel} \times h_{fuel}/V_{Dryer\ Exh} = [(c_p \times T)_{mix} - (c_p \times T)_{Dryer\ Out}] + \{[Q_{Process} - (m \times h)_{Solvent}]/V_{in}\} + [(c_p \times T)_{Stack} - (c_p \times T)_{MUA}] \times \{[(c_p \times T)_{Bypass} - (c_p \times T)_{Mix}]/(c_p \times T)_{Bypass} - (c_p \times T)_{MUA}]\} - [(V_{fuel}/V_{Dryer\ Exh}) \times (c_p \times T)_{Fuel}]).$$

Figure 3:
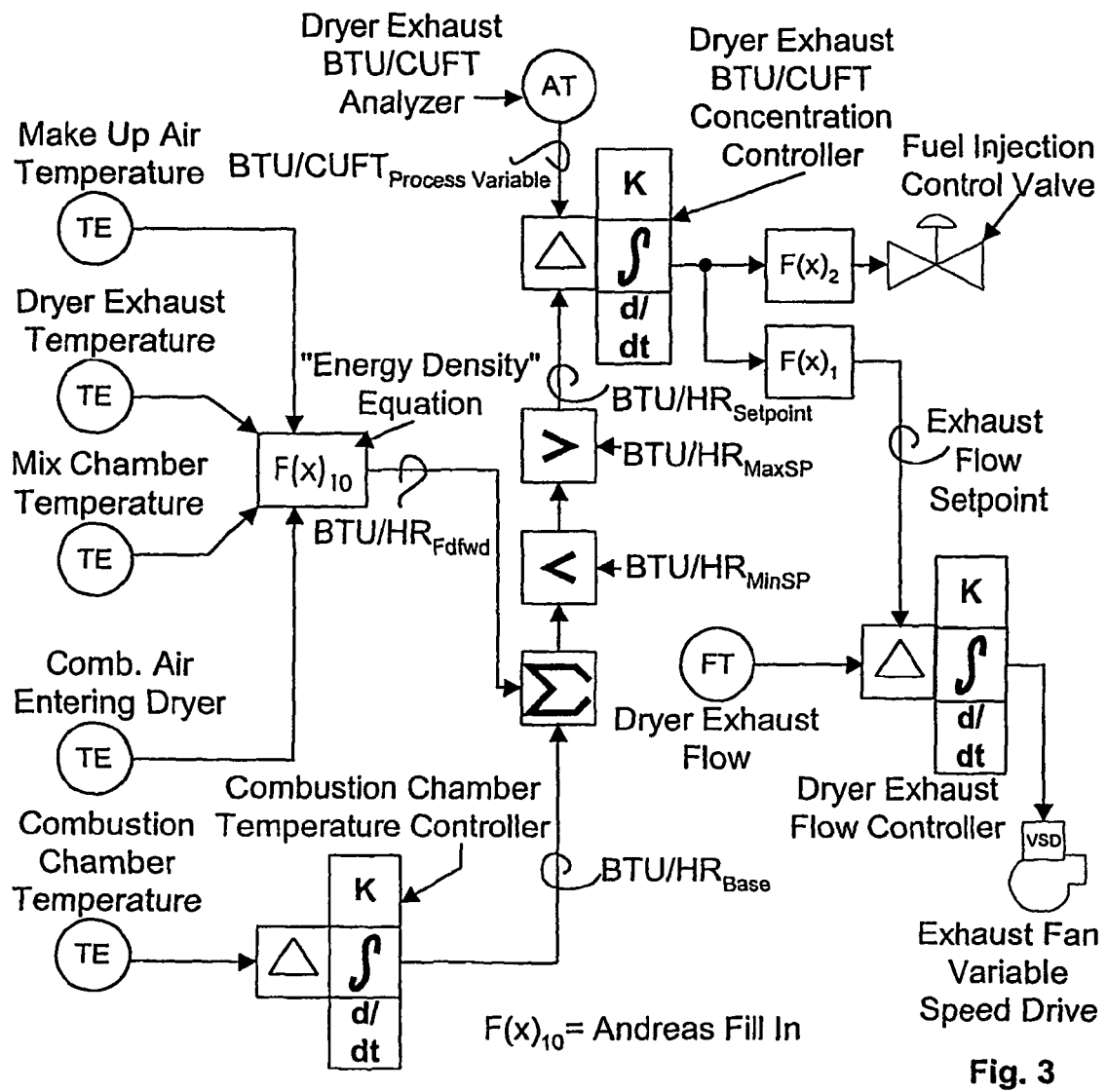
FIG. 3 is a flow diagram showing a control scheme for an oxidizer in accordance with one embodiment of the present invention.

This energy density is a calculated value derived from instantaneous process temperature measurements. For example, FIG. 3 depicts a potential control scheme for an integrated regenerative thermal oxidizer in which the temperature control points are make-up air, dryer exhaust, combustion air entering dryer, and mix box temperature (the mix box is where ambient make-up air and combustion chamber air are mixed prior to being fed to the dryer). In this example, the energy density value is used as a feedforward signal (BTU/CUFT$_{Fdfwd}$) and is summed with the base (BTU/CUFT$_{Base}$) set point value. In this configuration, instantaneous changes in the drying process are immediately reflected in the BTU/CUFT$_{Fdfwd}$ value and transferred to the exhaust flow BTU/CUFT concentration controller's set point.

Finally, this predicted energy density, which consists of both terms (BTU/CUFT$_{Set[point]}$=BTU/CUFT$_{Base}$+BTU/CUFT$_{Fdfwd}$), is permanently compared with results of an analyzer (AT) signal (BTU/CUFT$_{ProcessVarialble}$) that senses the real energy density in the process flow at a suitable position after the location of fuel injection, but before the inlet into the heat exchanger beds. (Such analyzers are commercially available from, e.g., Control Instruments and Unisensor Sensorsysteme GmbH. They use physical principles such as flame temperature, IR spectroscopic, etc.) The difference between the predicted energy density (BTU/CUFT$_{Set[point]}$) and the sensed one (BTU/CUFT$_{ProcessVariable}$)

is in this case utilized in a PID controller used to modulate the fuel injection control valve and variable speed controlled exhaust fan to maintain the energy density concentration at set point.

Figure 4:
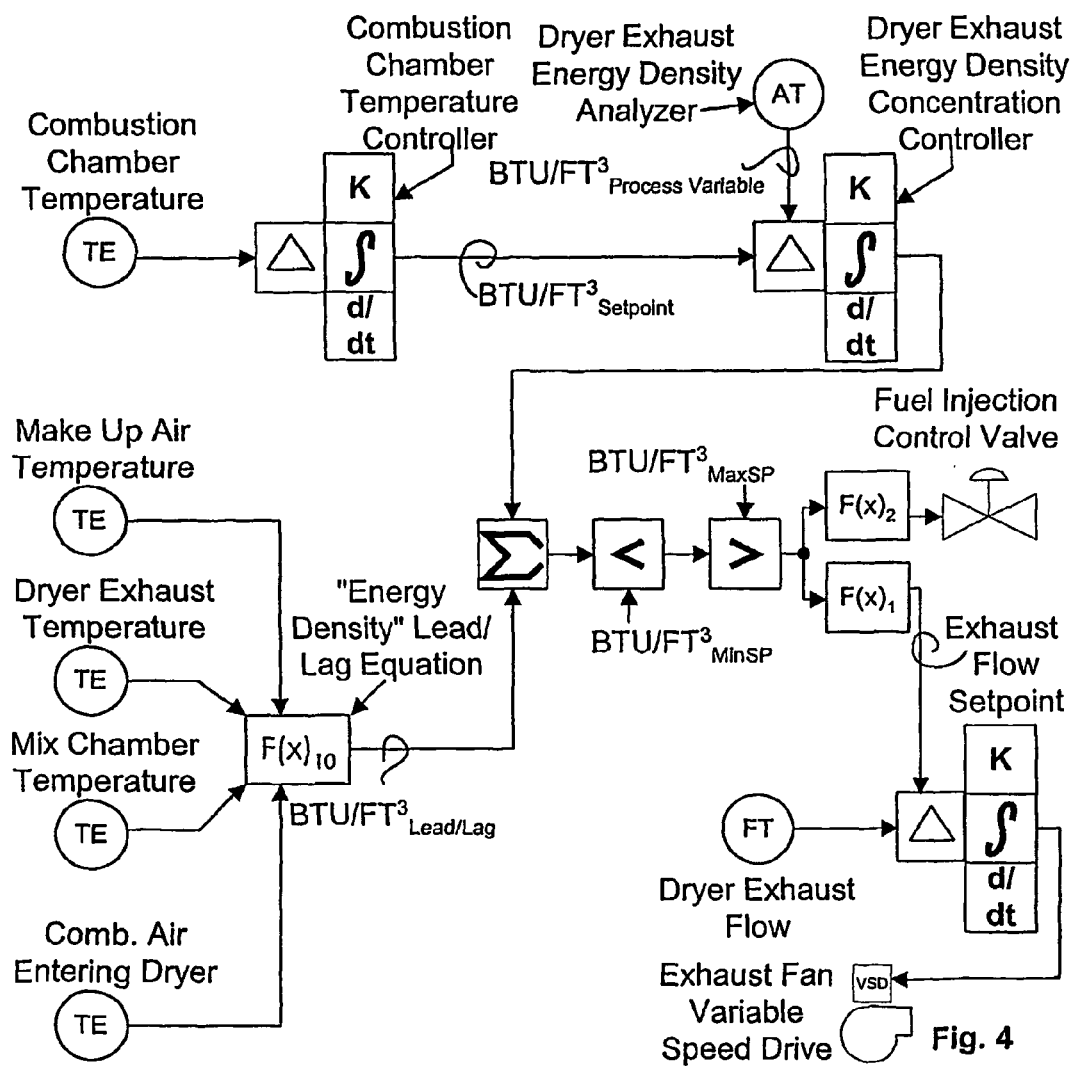
FIG. 4 is a flow diagram showing a control scheme for an oxidizer in accordance with one embodiment of the present invention.

Experimentation has indicated that the energy density oscillates between flow switches because of the moving temperature profile inside the regenerative heat exchanger. In order to stabilize the temperature profile, the calculated energy density, which is based on the sensed temperatures, can be superimposed with a phase lead or phase delay depending on, e.g., switch time, flow rate, and flow history (refer to FIG. 4).

BTU/CUFT Concentration Controller Final Control Element Manipulation Scheme

Figure 8:
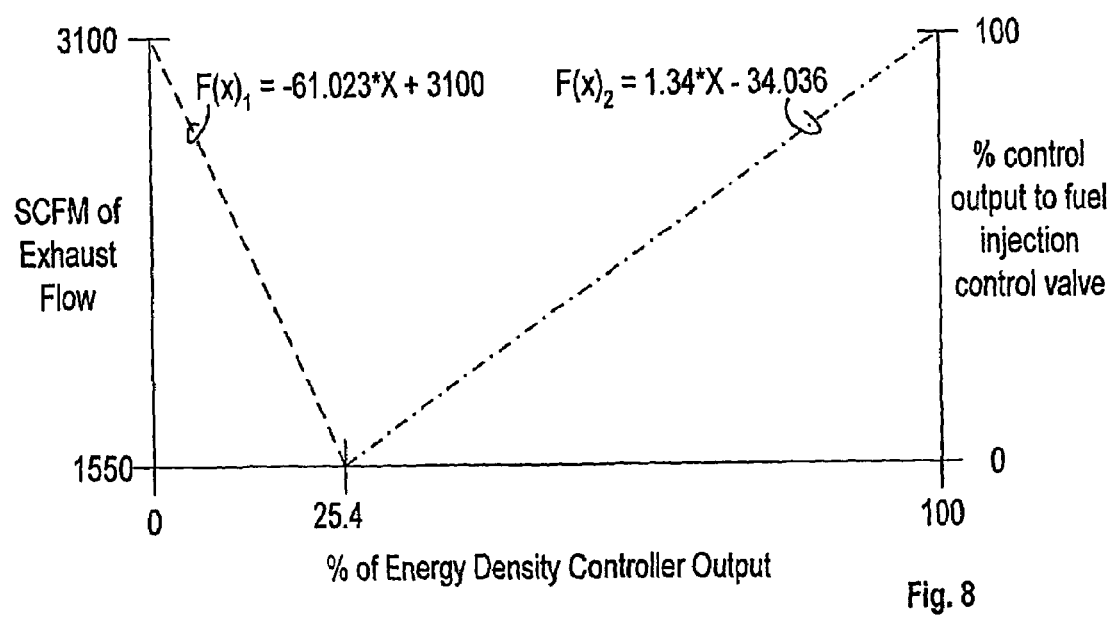
FIG. 8 is a graph showing the relationship between the energy density controller output and exhaust flow and output to the fuel injection control valve in accordance with the present invention.

As the process comes on line, solvents are released, causing the $BTU/FT^3_{ProessVarialble}$ concentration to increase and cause the fuel injection control valve to close (via $F(x)_2$) as the $BTU/FT^3$ control system maintains the $BTU/FT^3_{Set\ [point]}$. As the process speed increases, more solvents are released, causing the fuel gas injection control valve to eventually shutoff. Up to the point of fuel gas injection control valve shutting off, the exhaust fan is at a minimum exhaust flow set point. The control system is setup so that there is seamless transition, via split ranged modulation coordination between exhaust fan variable speed drive equation or an exhaust flow set point equation $F(x)_1$ and fuel injection control valve equation $F(x)_2$, For example, referring to FIG. 8, the energy density control loop output is used to develop a control output to the fuel injection control valve $(Fx)_2$ and as flow set point to the Exhaust Flow control loop $(F(x)_1)$. For accurate development of $F(x)_1$ and $F(x)_2$, relational effects of the injected fuel and the exhaust flow on the oxidizer combustion chamber must be examined. In this example, thermal energy (BTU/Min) of each component must be considered as the controlled parameter is temperature. In this example, assume that the process solvent thermal energy contribution is 750000 BTU/HR. The fuel gas injection contribution has a maximum limit of 11.84 $BTU/FT^3_{air}$. If the fuel is methane, 11.84 $BTU/FT^3_{air}*0.001\ FT^3_{methane}/BTU=0.01184\ FT^3_{methane}/FT^3_{air}$. As the maximum exhaust flow is 3100 $FT^3_{air}/Min$. of 186000 $FT^3_{air}/HR$ of air, 186000 $FT^3_{air}/HR*0.01184\ FT^3_{methane}/FT^3_{air}=2202.24\ FT^3_{methane}/HR$. Therefore, the fuel gas injections thermal energy contribution is 2202.24 $FT^3_{methane}/HR*1000\ BTU/FT^3$ is 2,202,240 BTU/HR. By comparing the two influence ranges, a Relational Gain factor for each parameter can be obtained by applying the following equation. Relational Gain A=Total span scalar A/total span scalar A+total span scalar B+total span scalar C+etc. In this example, Relational Gain of the process solvent=process solvent BTU/HR (756000)/process solvent BTU/HR (756000)+fuel gas injection BTU/HR (2202240). The Relational Gain for the process solvent=0.254. Applying the same logic to the fuel gas injection, the Relational Gain of the fuel gas injection=0.7458 (2202240/2950000). Interpretation of the results indicates that the exhaust flow will be allocated 25.4% and the fuel injection system will be allocated the remaining 74.58% of the energy density controller's output. In the interest of understanding, let us assume that the characterizations of the controlled variables are linear. Referring to FIG. 8, as the exhaust fan is the primary control device for control of the exhaust flow, it will be allowed to linearly modulate from 1550 SCFH to 3100 SCFH of its control set point range in relation to 0–25.4% of the energy density controller output signal. Similarly, the fuel injection control valve will be allowed to linearly modulate from 0 to 100% of its control range in relation to 25.4–100% of the energy density controller's output. $F(x)_1$ is derived in this case by using the equation for straight line, Y=mX+b. Where, m=(1550−3100)/(0−25.4) or −61.023. Substituting, when Y=3100 and X=0, b=3100−(−61.023*0). Therefore, Y=−61.023*X+3100. $F(x)_2$ is derived in this case by using the equation for straight line, Y=mX+b. Where, m=(100−0)/(100−25.4) or 1.34. Substituting, when Y=0 and X=25.4, b=0−(1.34*25.4). Therefore, Y=1.34*X−34.036. For example, as the $BTU/FT^3$ concentration increases as a printing press speed increases, in the effort to control the $BTU/FT^3$ concentration, the fuel gas injection control valve closes down and at point that the fuel gas injection control valve closes off, the minimum exhaust flow set point is increased. Vice versa, as the press speed decreases, the amount of released solvents will also decrease, causing the exhaust flow to decrease to the minimum flow level and the fuel gas injection control valve to open and begin to modulate. Modulation of the exhaust fan is typically accomplished with the use of variable speed drive.

Adaptive Control of Exhaust Flow

The exhaust flow is a manipulated variable for the $BTU/FT^3$ concentration, combustion chamber temperature, dryer box pressure, and dryer zone 1 air temperature controller loops in the combined prototype regenerative oxidizer/printing press drying system. Control of the exhaust flow is critical for safe and efficient operation of the system.

Figure 5:
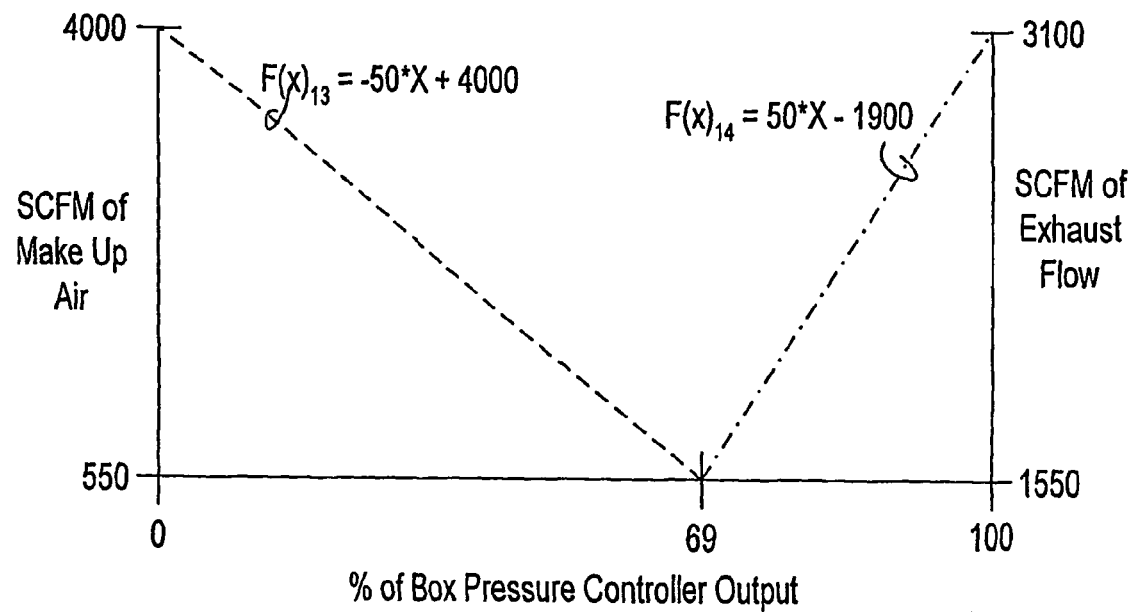
FIG. 5 is a graph showing the relationship between dryer box pressure controller output and make-up air and exhaust flow rates.
Figure 6:
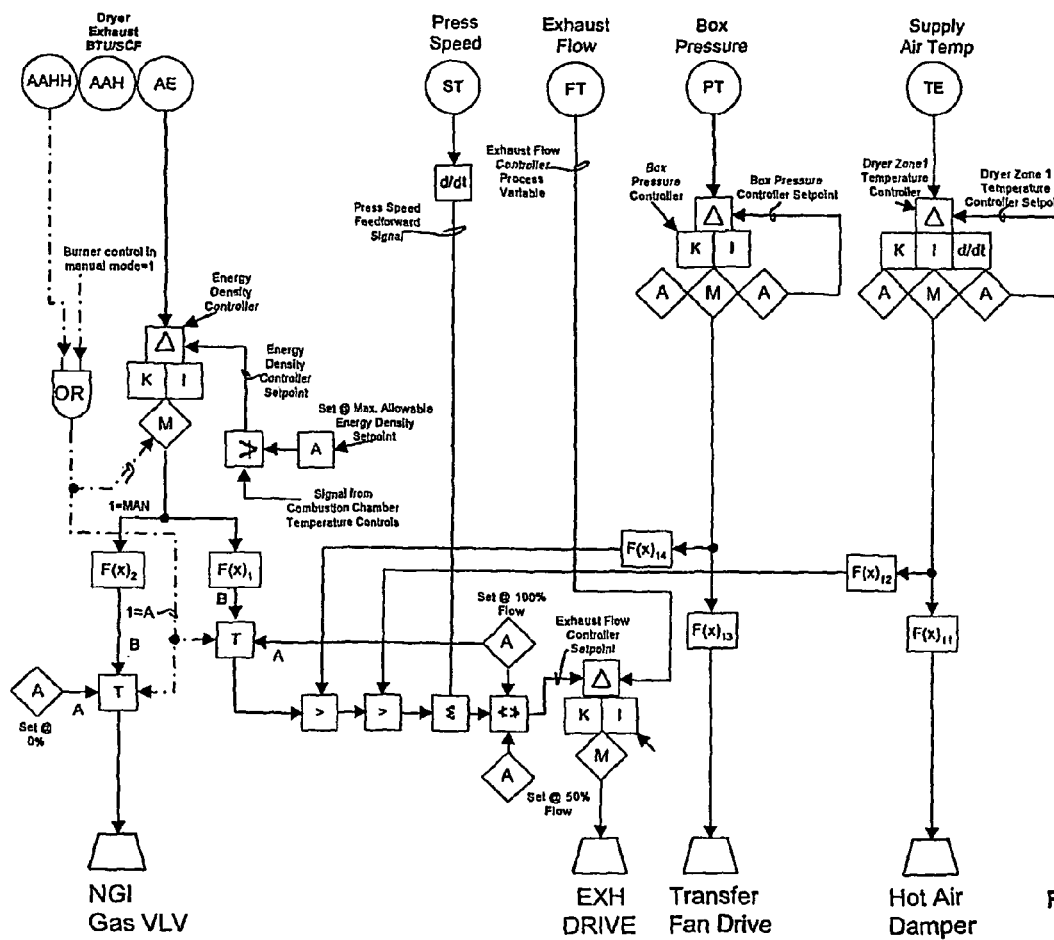
FIG. 6 is a schematic view of a control scheme for the oxidizer in one embodiment of the present invention.

Examination of Dryer Box Pressure, Press Speed and Dryer Zone 1 Air Temperature Control Exhaust Flow Set Point Cross Limit Control Scheme As the dryer box pressure and dryer zone 1 temperature control are affected by the exhaust flow rate, the exhaust flow set point needs to be trimmed to accommodate proper operation of these subsystems. The controls are designed to adapt to changing process conditions such as changes in web stock, coating thickness and substrate, and printing coverage for example. In respect to the dryer box pressure, as exhaust flow increases, the need for dryer make up increases and vice versa. As the BTU/HR concentration controls are designed to minimize the exhaust flow to maximize the dryer efficiency, it is possible for the exhaust flow to be reduced down to a level that causes the box pressure controls to operate with a box pressure controller output less than 5%. For example, refer to FIG. 6 below, the box pressure control loop output is used to develop a control output to the Make up Air Transfer Fan $(Fx)_{13}$ and as flow set point to the Exhaust Flow control loop $(F(x)_{14})$. For accurate development of $Fx)_{13}$ and $F(x)_{24}$, relational effects of the transfer fan flow and the exhaust flow on the dryer box pressure must be examined. In this example, the exhaust flow setpoints range from 1550–3100 SCFH of air and the transfer fan range of control is 550–4000 SCFH of air. As can be seen, the range of exhaust flow is 3100−1550=1550: FH and the transfer fan range is 4000−550=3450 SCFH. By comparing the two influence ranges, a Relational Gain factor for each parameter can be obtained by applying the following equation. Relational Gain A=Total span scalar A/total span scalar A+total span scalar B+total span scalar C+etc. In our example, Relational Gain of the transfer fan=total span of transfer fan (3450)/total span of transfer fan (3450)+total span of exhaust fan (1550). The Relational Gain for the transfer fan=0.69. Applying the same logic to the exhaust fan, the Relational Gain of the exhaust fan=0.31 (1550/3450+1550). Interpretation of the results indicates that the transfer fan will be allocated 69% of the box pressure controller's output and the exhaust fan will be allocated the remaining 31% of the box pressure controller's output. In the interest of understanding, let us assume that the characterizations of the controlled variables are linear. Referring to FIG. 5, as the transfer fan is the primary control device for control of the box pressure, it will be allowed to linearly modulate from 13.75%–100% of its control range in relation to 0–69% of the box pressure controller output signal. Similarly, the exhaust fan will be allowed to linearly modulate from 50 to 100% of its control range in relation to 69–100% of the box pressure controller's output. $F(x)_{13}$ is derived in this case by using the equation for a straight line, Y=mx+b. Where, m=(4000−550)/(0−69) or −50. Substituting, when Y=4000 and X=0, b=4000−(−50*0). Therefore, Y=−50*X+4000. Solving for $F(x)_{14}$, m=(3100−1550)/(100−69)=50. Solving for b, Y=1550 when X=69, b=1550−(50*69)=−1900. Therefore, $F(x)_{14}=50*X-1900$.

Essentially, upon examination of the operation of the box pressure control loop is that as the dryer box pressure becomes more positive, the dryer box pressure controller's output increases thereby decreasing the amount of make up air into the dryer. When the dryer box pressure controller output passes through 69%, the output to the transfer fan is held at the minimum speed and the exhaust flow set point begins to increase. The signal from $F(x)_{14}$ is input into a high select function block in which it is compared with the other exhaust flow set point generating the signals. As the box pressure controller output continues to rise, the exhaust flow set point increases and eventually becomes the highest exhaust flow set point value and the dryer box pressure is controlled by modulating the exhaust fan. This continues until another exhaust flow set point signal becomes larger and this signal takes over. With the other control signal calling for a higher exhaust rate, the dryer box pressure will become more negative, reducing the dryer box pressure controller output and raising the speed set point of the transfer fan drive to add additional make up air.

Examination of Dryer Zone 1 Supply Air Temperature Control on Dryer Exhaust Flow Set Point The dryer zone 1 supply air temperature control uses hot combustion chamber air to heat the dryer enclosure. The amount of hot air that is available for heating and drying the web is dependent upon the exhaust flow rate. The dryer zone 1 temperature control loop controls the hot air damper and the exhaust flow set point. The control scheme utilizes the relational gain technique described in box pressure control scheme above and in FIG. 5. Development of the relational gains for this example requires definition of common units that relate to the physical parameter that needs to be controlled. In this case, the units will be BTU/Min, which can be considered a heat rate. Assuming that the flow of combustion chamber air through the hot air supply damper @ 100% open is 1850 SCFM at 1600° F. Enthalpy for this air is ~582.01 BTU/LBM and that the specific volume is 51.93 Ft$^3$/LBM. Solving for BTU/Ft$^3$: 582.01 BTU/LBM*1/51.93 LBM/Ft$^3$=11.20758 BTU/Ft$^3$.

Solve for dryer 1 supply air BTU/Min: 11.20758 BTU/Ft$^3$*1850 Ft$^3$/Min=20734 BTU/Min.

For this example, the maximum exhaust flow rate is 3100 Ft$^3$/Min and the maximum allowable % LEL set point is 25% or 11.84 BTU/Ft$^3$.

Solving for BTU/Min value for the maximum exhaust flow: 3100 Ft$^3$/Min*11.84 BTU/Ft$^3$=36704 BTU/Min.

As this energy is not entirely available to the combustion chamber, a 5% loss was assumed yielding ~34868.8 BTU/Min.

Calculate the total BTU/Min that is being controlled with this application, 34868.8+20734=55602.8 BTU/Min.

Calculate the relational gains for each of the controlled variables:

Dryer Supply Air=20734/55602.8=0.3729

Exhaust Flow=34868.8/55602.8=0.6271

Figure 7:
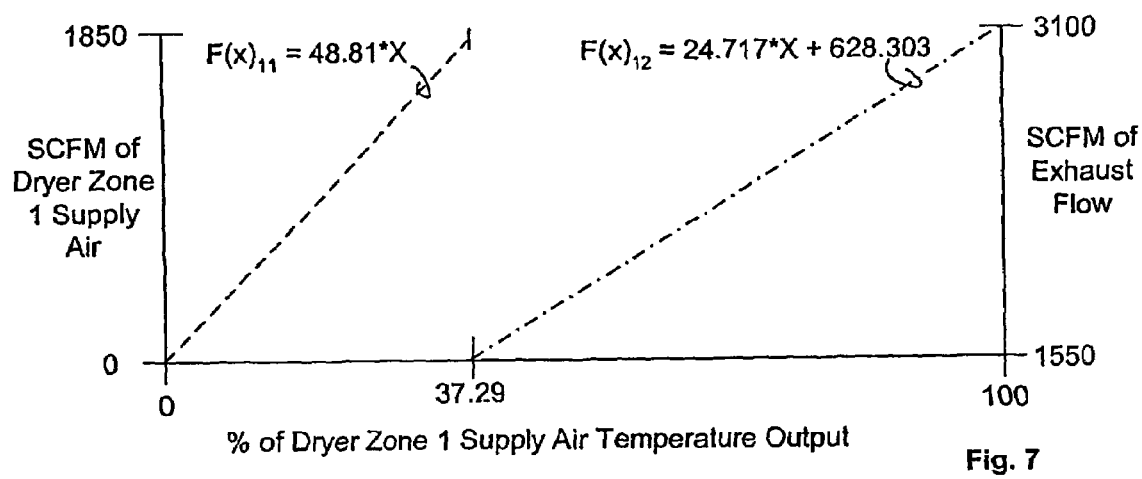
FIG. 7 is a graph showing the relationship between a dryer zone supply air temperature output and supply air and exhaust flow rates.

Referring to FIG. 7 and assuming for simplicity a linear heat release from each of the control elements the following chart maybe drawn.

Calculation of $F(x)_{11}$:

m=1850−0/37.9−0=48.81, substituting in Y=mx+b, when Y=0, X=0, therefore b=0.

$$F(x)_{11}=48.81*X$$

Calculation of $F(x)_{12}$:

m=3100−1500)/100−37.29=24.717, substituting in Y=mx+b, when Y=1550, X=37.29, solving for b. 1550−37.29 (24.717)=b=628.303.

Therefore $F(x)_{12}=24.717*X+628.303$.

Essentially, examination of dryer 1 supply air temperature control loop operation is that as the dryer zone 1 supply air temperature begins to drop from the set point, the dryer zone 1 temperature controller's output increases thereby opening the hot air damper. As demand for heat increases to 37.29% of the dryer 1 temperature controller output, the hot air damper is now at 100% open. Further increases in the dryer zone 1 temperature controller output begin to increase the exhaust flow set point through $F(x)_{12}$ and keep the hot air damper at 100% open. The signal from $F(x)_{12}$ is input into a high select function block in which it is compared with the other exhaust flow set point generating the signals. As the dryer zone 1 temperature controller output continues to rise, the exhaust flow set point increases and eventually becomes the highest exhaust flow set point value and dryer zone 1 temperature is controlled by modulating the exhaust fan. This continues until another exhaust flow set point signal becomes larger and this signal takes over. With the other control signal calling for a higher exhaust rate, the dryer zone 1 temperature will become too hot, reducing the dryer zone 1 temperature controller output low enough to return the hot air damper to modulation.

Examination of Press Speed Feed Forward Signal

Press speed is used as a feed forward signal and its input is summed with the exhaust flow set point value. In this case, the press speed signal is interfaced with a derivative block in which the output is relative to the rate of change of the press speed signal. For example, if the press speed is steady, the output from the derivative block will be zero (0). With a rapid increase in press speed, the output from the derivative block will be a significant value that when summed with the exhaust flow set point will cause the exhaust flow to increase, adding additional BTU's to the oxidizer before the effect of the speed increase or decrease will be sensed by instrumentation. This response is beneficial in preventing serious sagging of media bed and combustion chamber temperatures which could potentially affect the stability of dryer zone 1 supply air temperature control.

Incorporation of high select logic allows the control loop with the greatest need for an elevated exhaust level to gain control of exhaust flow final control element.

Establishing a heat index for each bed provides the following advantages:

Provides a value indicative of the media bed stored thermal energy; and

Provides a value indicative of the location of the oxidation point in the media bed.

With a heat index value, the thermal storage of each media bed can be instantaneously monitored and controlled. This eliminates the 'wait until the oxidation point reaches the end of the media bed' approach currently employed in industry. Due to the characterization of the heat index equation, as the oxidation zone moves away from the combustion zone, the heat index value exponentially increases with respect the oxidation zone distance from the combustion zone. This functionality serves to rapidly alter the switch times for the media beds to correct for a heat imbalance situation. It also provides an accurate indication of the location of the oxidation zone in the media bed.

The use of the energy density method of determining and controlling the supplemental fuel in regenerative thermal systems provides the following advantages:

(a) The thermodynamic energy demand is calculated based on temperature measurements at various locations in the apparatus, (b) An analyzer is used for revealing the factual energy content in a process gas, and (c) The applications (a) and (b) are combined for introducing the appropriate amount of fuel into the system.

The improvement over prior art is the response to process changes are instantaneous and provide a feed forward signal. This advantage makes the operation of more complex systems (e.g., integrated dryer with RTO) safer and more efficient through the application of increased sophistication of the control systems.

The advantages of the valve switch timing control scheme include the advantage that the valve switch control scheme adaptively adjusts the base media bed switch time to optimize the thermodynamic heat transfer as dictated by the exhaust flow rate. This technique is not currently used in an integrated regenerative thermal oxidizer/dryer application.

The advantages of the BTU/CUFT concentration controller final control element manipulation scheme are as follows:

(a) Provides multi final control element control from one PID loop.

(b) Engineered to have one set of PID loop tuning parameters that works for all the multi final control elements.

(c) Split ranging of the final control elements allows a bumpless or seamless transfer from one final control element to the next.

These techniques have not been implemented before in regenerative thermal oxidizer or an integrated regenerative thermal oxidizer/dryer.

The use of the BTU/CUFT concentration controller set point derivation scheme is unique to integrated regenerative thermal oxidizer/dryers in that:

(a) Process system exhaust BTU/CUFT concentration is controlled. This provides fast accurate response to process changes as opposed to measuring slow temperature rises across oxidation systems and exhaust flow rates based on line speed signals.

(b) Regenerative oxidizer combustion chamber temperature is used to calculate the base BTU/CUFT concentration level.

(c) Use of energy density equation and a line speed as feedforward signals to keep the regenerative thermal oxidizer at the auto thermal point of operation.

Controlling the exhaust flow under multiple control loops is unique to integrated regenerative thermal oxidizer/dryers in that:

(a) The prior art for exhaust control has been to linearly adjust the exhaust volume based on line speed and/or temperature rise across an oxidizer system. With a plurality of variables dependent upon exhaust flow volume, the exhaust flow control scheme is more intelligent and adaptable to maintain the integrated regenerative thermal oxidizer/dryer operation at optimum operating efficiency. This is accomplished through the use of a high exhaust flow set point signal select circuit and use of press speed feed forward signals.

(b) The energy density controller automatically compensates for high or low BTU/CUFT process excursions by regulating the fuel gas injection valve and controlling the exhaust flow set point. This control sub-system provides the base line exhaust flow set point value and works to minimize the exhaust and maximize fuel savings.

(c) The dryer zone 1 temperature control scheme compensates for process conditions that exceed the exothermic energy offered through the fuel gas injection system operating at the maximum allowable set point and a minimized exhaust level, i.e. high basis weight web/light coverage or low basis weight/heavy coverage by first modulating the hot air damper full open and then elevating the exhaust flow set point. As the BTU/CUFT concentration is controlled, increasing the exhaust flow will increase the flow of fuel gas, thereby raising the exothermic energy level in the oxidizer.

(d) The exhaust control scheme utilizes the rate of change of press speed as a feedforward signal which is summed with the exhaust flow set point.

(e) Uniqueness of using relational gain concepts to split range control outputs.

What is claimed is:

1. A regenerative thermal oxidizer, comprising:
at least first and second regenerator columns, each of said columns comprising heat exchange media;
gas inlet means and gas outlet means in communication with each of said regenerator columns;
a combustion zone in communication with each of said regenerator columns;
valve means for alternately directing said gas into the gas inlet means of one of said columns in a first direction and through another of said columns in a second direction;
a plurality of temperature sensing means for detecting temperature of said gas in a plurality of predetermined locations in each of said columns;
thermal energy calculating means for calculating a first value indicative of the stored thermal energy in the heat exchange media in said first regenerative column and a second value indicative of the stored thermal energy in the heat exchange media in said second regenerative column;
determining means for determining the difference between said first and second values;
comparison means for comparing said difference to a predetermined value; and
switching means responsive to said comparison means for controlling the timing of valve means.

2. The oxidizer of claim 1, further comprising:
energy density calculating means for calculating the energy density of the process gas based upon said detected temperatures of said gas;
measuring means for measuring the actual energy density of said process gas;
means for comparing said calculated energy density to said actual energy density; and
means for regulating the amount of supplemental fuel added to said oxidizer based upon said comparison.

3. Process for operating a regenerative thermal oxidizer having at least first and second regenerator columns, each of said columns comprising heat exchange media, gas inlet means and gas outlet means in communication with each of said regenerator columns, a combustion zone in communication with each of said regenerator columns, and valve means for alternately directing said gas into the gas inlet means of one of said columns in a first direction and through another of said columns in a second direction; said process comprising:

Sensing the temperature of said gas in a plurality of predetermined locations in each of said columns;

calculating a first value indicative of the stored thermal energy in the heat exchange media in said first regenerative column and a second value indicative of the stored thermal energy in the heat exchange media in said second regenerative column;

determining the difference between said first and second values;

comparing said difference to a predetermined value; and actuating said valve means in response to said comparison.

4. The process of claim 3, further comprising:

calculating the energy density of said gas based upon said sensed temperatures of said gas;

measuring the actual energy density of said gas;

comparing said calculated energy density to said actual energy density; and regulating the amount of supplemental fuel added to said oxidizer based upon said comparison.

* * * * *